June 21, 1960 E. V. SCHNEIDER 2,941,809
ADJUSTABLE IDLER MECHANISM FOR PHONOGRAPH DRIVE UNITS
Filed July 28, 1959 2 Sheets-Sheet 1

INVENTOR.
EMMOR V. SCHNEIDER
BY
W. B. Harpman
ATTORNEY

June 21, 1960 E. V. SCHNEIDER 2,941,809
ADJUSTABLE IDLER MECHANISM FOR PHONOGRAPH DRIVE UNITS
Filed July 28, 1959 2 Sheets-Sheet 2

INVENTOR.
EMMOR V. SCHNEIDER
BY
W. B. Harpman
ATTORNEY

United States Patent Office 2,941,809
Patented June 21, 1960

2,941,809
ADJUSTABLE IDLER MECHANISM FOR PHONOGRAPH DRIVE UNITS

Emmor V. Schneider, Alliance, Ohio, assignor to The Alliance Manufacturing Company, Division of Consolidated Electronics Corporation, Alliance, Ohio, a corporation of Delaware Filed July 28, 1959, Ser. No. 830,066
6 Claims. (Cl. 274—9)

This invention relates to adjustable idler mechanisms in a phonograph drive unit and more particularly to an axial adjustment feature for an idler wheel carrying mechanism.

The principal object of the invention is the provision of an axially adjustable idler wheel carrying mechanism which can be readily adjusted in the factory or in the field.

A further object of the invention is the provision of an adjustable idler wheel carrying mechanism in a drive train which eliminates the need of shims or washers in the idler mechanism.

A further object of the invention is the provision of an idler wheel carrying mechanism which is adjustable by screw means so as to be infinitely adjustable.

A further object of the invention is the axial adjustment of a part of a drive train mechanism which adjustment may compensate for normal wear and may also compensate for initial changes in the present position of the drive train mechanism caused by machining defects.

A still further object of the invention is the provision of the axial adjustment of a pivoted idler wheel carrying arm in a drive train mechanism arranged to be readily adjustable by a unskilled person.

Phonograph drive mechanisms, as known in the art, generally take the form of a relatively small high speed motor, the motion of which is transmitted through a high gear ratio mechanism to a phonograph turntable which rotates at relatively low speeds. For example, the motor may run at a speed of approximately 3400 r.p.m. and successfully drive a phonograph turntable at a speed in the range of 16 to 78 r.p.m. The speed reduction ratio therefore varies from 50 to 1 to 200 to 1. Of unusual importance in considering the problem of successfully driving the phonograph turntable is the existence of eccentricities in the mechanical parts of the unit which are difficult to eliminate economically, as a result a floating idler wheel is generally utilized which is carried by an idler mechanism arranged to permit the idler wheel to have limited floating movement in two directions in a plane which is usually horizontal in order to compensate for slight eccentricities in the turntable, etc. Such mechanisms mount the idler wheel and its carrying means between an annular rim of the turntable and the drive shaft of the motor.

As is also known in the art, it is necessary for phonograph drive mechanisms to be capable of rotating the turntable at several different speeds. For example, 16⅔, 33⅓, 45 and 78 r.p.m. are normally desirable. Speed changing mechanisms are therefore required and such mechanisms usually provide that the idler wheel and a portion of the mechanism carrying the same have vertical speed adjusting movement as well as the limited horizontal floating movement heretofore referred to. Such idler wheels are generally mounted on some form of idler mechanism which provides for freedom of movement in two directions in a plane and hence this idler mechanism requires several interconnecting parts including several pivotal connections. In making the idler wheel and its carrying mechanism vertically movable for speed change function an additional problem is presented in that it is difficult to maintain constant manufacturing tolerances in continuous production and still produce an economical phonograph drive mechanism. In such mechanisms the idler wheel must engage at least two different diameters on a drive shaft when it is moved vertically for speed change function, as the different diameters of the drive shaft comprise two different portions thereof.

Since it is desirable that the idler wheel in the completed assembly be positioned to correctly frictionally engage the desired portion of the drive shaft, it is necessary to provide vertical adjustment means for the idler wheel or the idler wheel carrying mechanism in order to provide for compensation of the very large possibly cumulative tolerances occurring in the assembly of a number of manufactured parts. It has heretofore been the practice to adjust the position of the idler wheel with respect to its carrying mechanism by the use of the shims or washers positioned on one or more of the shafts in the idler mechanism to thereby correctly axially position the idler wheel in the final assembly. Such practice has disadvantages which are basically caused by the fixed thickness of the shims or washers used and the difficulty of choosing the correct combination thereof together with the attendant difficulty of handling the small parts in a limited area. Additionally, machining defects such as burrs may temporarily misposition the idler wheel so that an eventual adjustment must be provided to compensate therefor.

The adjustable idler wheel carrying mechanism disclosed herein takes into consideration the several problems involved and achieves the several objects of the invention.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
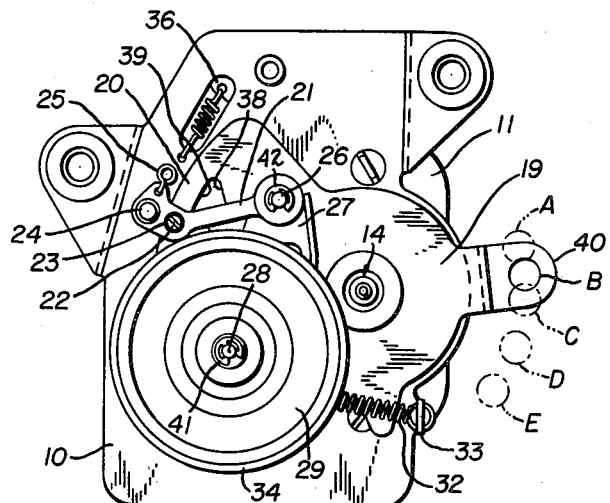
Figure 1 is a plan view of the phonograph device mechanism including the invention.

The figures of the drawing illustrate the invention as incorporated in a phonograph drive unit which is adapted to be positioned in a phonograph to drive the rim (not shown) of the turntable thereof from a motor incorporated in the unit. The unit includes a horizontally disposed frame 10, as used with a horizontally disposed phonograph turntable, and which frame 10 carries a motor 11 which in turn includes bearing assemblies 12 and 13 mounting a vertically positioned drive shaft 14. The drive shaft 14 extends upwardly through an opening in the frame 10 and its upper portion has four steps 15, 16, 17 and 18 of different diameters. These four steps 15, 16, 17 and 18 are selected to be of the correct diameter to provide 78, 45, 33⅓ and 16⅔ r.p.m.

of the turntable, respectively. A shifter plate 19 is pivoted to the frame 10 at the drive shaft 14 and carries a shifter cam 20 which engages the underside of an idler link 21 and more specifically with the bottom end of an adjustment screw 22 threadably positioned in a vertically disposed threaded opening 23 in one end of the idler link 21.

The idler link 21 is pivotally mounted on a pin 24 which is positioned on the frame 10, and a spring 25 is connected between the idler link 21 and the frame 10 and maintains the adjustment screw 22 in engagement with the shifter cam 20. The opposite end of the idler link 21 forms a bushing journalled on a stud 26 which is carried on one end of an idler plate 27. The other end of the idler plate 27 has a spindle 28 on which an idler wheel 29 is journalled. An opening 30 in the idler plate 27 provides for the positioning of a secondary pin 31 which forms a means for moving the idler plate 27 horizontally, as necessary when the idler wheel 29 is moved vertically. A second spring 32 is connected between the ends of the idler plate 27 adjacent the spindle 28 and an upturned portion 33 of the frame 10 and maintains the idler plate 27 in tensioned relation in the unit.

The idler wheel 29 is provided with a rim 34 of rubber-like resilient material so that satisfactory frictional contact between anyone of the steps 15, 16, 17 and 18 of the drive shaft 14 and the flange of the phonograph turntable is assured.

The shifter plate 19 has a relatively large opening 35 therein which permits relative motion of the shifter plate 19 with respect to the secondary pin 31. The secondary pin 31 is also movable relative to the frame 10, through an opening therein, as the pin 31 is mounted on a spring tensioned side piece 36 which is slidably positioned beneath the plate 10 and arranged to be actuated by an upstanding portion 37 thereof being engaged by a secondary cam 38 formed as one edge of an arcuate slot 39 formed in the shifter plate 19, as will be understood by those skilled in the art.

The shifter plate 19 and its integrally formed cams 20 and 38 is adapted to be moved by motion imparted to a sidewardly projection arm 40 and by referring to Figure 1 of the drawings it will be seen that solid and broken line representations of circles A, B, C, D and E positioned on an arc based on the drive shaft 14 indicate the various positions of the arm 40 which correspond with the respective portions of the cams 20 and 38.

Those skilled in the art will recognize that movement of the arm 40 from the neutral position as shown where the idler wheel 29 is out of registry with the drive shaft 14 will alternately position the idler wheel 29 as follows; when the arm 40 and the opening therein registers with the circle A the idler wheel 29 engages the step 15 and the turntable of the phonograph is driven at 78 r.p.m. Movement of the arm 40 so that the opening therein registers with circle C brings the idler wheel 29 into registry with the step 16 and movement of the arm 40 to register with circle D moves the idler wheel 29 into engagement with step 17 while movement of the arm 40 to registry with the circle E, brings the idler wheel 29 into registry with step 18. Each movement of the shifter plate 19 and its corresponding vertical and horizontal movement of the idler wheel 29 requires that the idler wheel 29 be temporarily moved out of contact with the drive shaft 14 and this is accomplished by the secondary cam surface 38 and the secondary pin 31, as will be understood by those skilled in the art.

The principal novelty in the present disclosure is in the idler mechanism mounting the idler wheel 29 and specifically the idler link 21 which is adjustable vertically on the pin 24 and relative to the frame 10 and the cam 20 by reason of the adjustment screw 22 forming the portion of the idler link 21 engaging the cam 20. It will thus be seen that the idler plate 27, being journalled on one end of the idler arm 21, moves vertically with the idler link 21 and the idler wheel 29 being journalled on the spindle 28 on the idler plate 27 thereby also moves vertically with the idler link 21 when the adjustment screw 22 is rotated.

Thus the formation of the journals mounting the idler wheel 29 on the idler plate 27 and the idler plate 27 on the idler link 21 are not critical and inexpensive constructions are thereby made possible at these points which constructions include C-shaped locking links 41 and 42 placed in grooves in the stud 26 and spindle 28 to hold the idler wheel 29 on the spindle 28 and the stud 26 in the bushing in the idler link 21.

Figure 2:
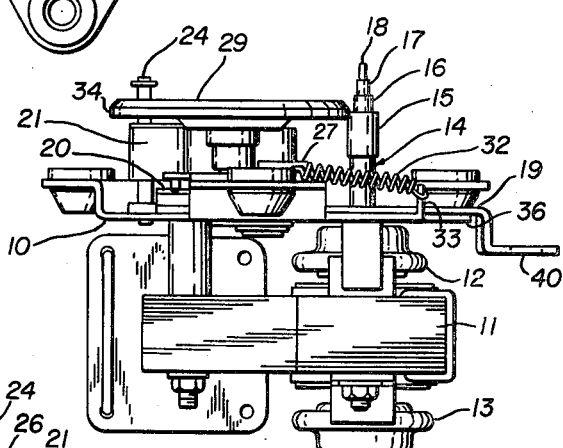
Figure 2 is a side elevation of the phonograph drive mechanism.
Figure 3:
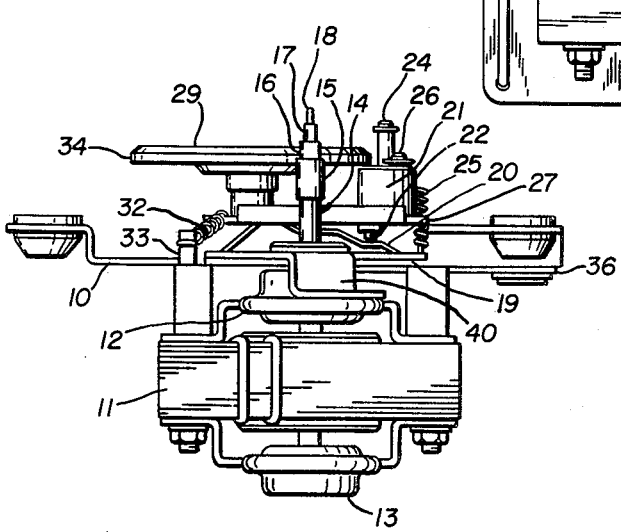
Figure 3 is a rear elevation of the phonograph drive mechanism.
Figure 4:
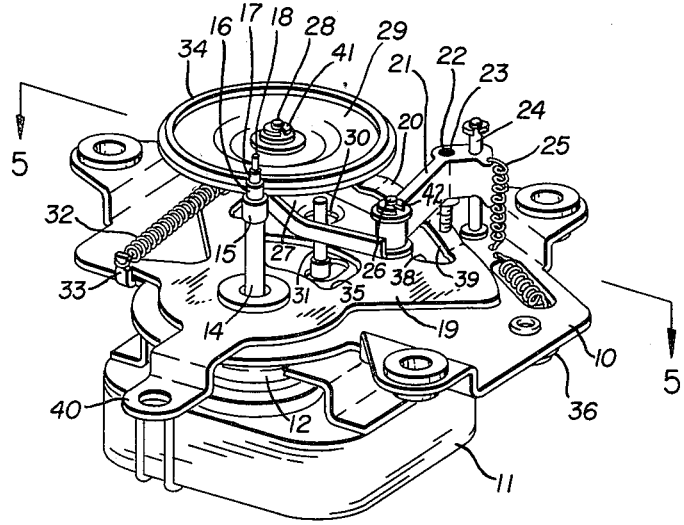
Figure 4 is a perspective view of the phonograph drive mechanism.
Figure 5:
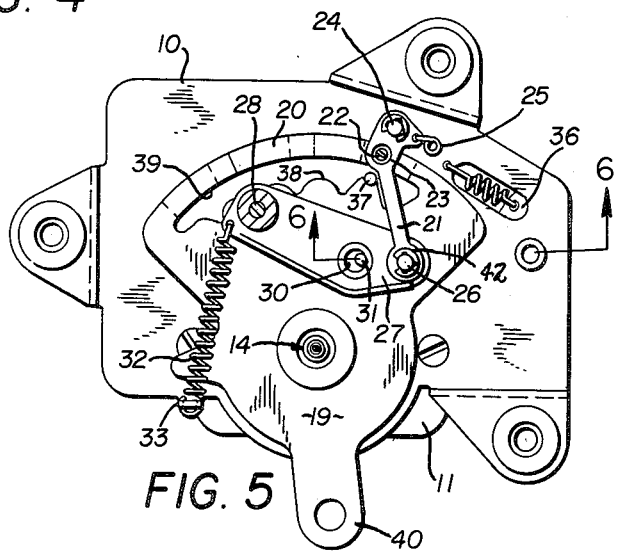
Figure 5 is a horizontal section on line 5—5 of Figure 4.
Figure 6:
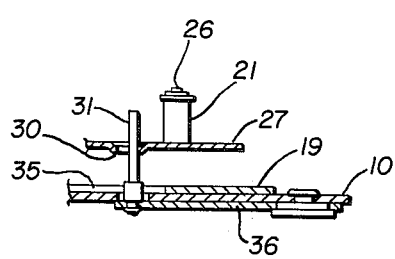
Figure 6 is a cross sectional detail on line 6—6 of Figure 5.

As shown in Figures 1, 2 and 4 of the drawings the idler wheel 29 is in neutral position, out of engagement with the drive shaft 14. In Figure 3 the idler wheel 29 is shown in engagement with step 17 and it will be observed that rotary motion imparted the screw 22 will raise or lower the idler link 21, the idler plate 27 and the idler wheel 29 in desired degree so that the proper engagement of the peripheral edge of the idler wheel 29 is made with respect to the desired step on the drive shaft 14.

In operation the mechanism, as will be understood by those skilled in the art, moves the idler wheel 29 relative to the drive shaft on both horizontal and vertical planes responsive to the change in position of the shifter plate 19 as heretofore described, while at the same time maintaining the idler wheel in its limited horizontal floating movement position which enables it to compensate for eccentricities in the several parts of the unit. The unit may therefore be assembled rapidly and inexpensively and final adjustment of the relative position of the idler wheel 29 with respect to the step on the drive shaft 14 easily and quickly accomplished by simple adjustment of the adjustment screw 22. In the event burrs are present on the several machined parts of the unit when assembled, such burrs would effect the relative positioning of the parts and despite a final adjustment at the factory a relatively short running time of the unit would wear away the burrs and thereby affect the desired positioning of the idler wheel 29 relative to the drive shaft 14. In the mechanisms heretofore used in the art repositioning of the idler wheel 29 involved major dismantling of the unit and the replacement or addition of appropriate shims and/or washers. The present invention eliminates this difficulty as a simple adjustment of the adjustment screw 22 repositions the idler arm 21, the idler plate 27 and moves the idler wheel 29 into proper registry with the steps on the drive shaft 14.

The present invention thus permits the quick and easy adjustment of the position of the idler wheel 29 relative to the drive shaft 14 through the use of a screwdriver or other simple tool thus meeting the several objects of the invention.

More importantly the simple adjustment of the position of the idler wheel 29 may be made by one who is relatively unskilled as it can be done without any guages by merely looking at the idler wheel 29 and then watching it as it is moved to its proper axial position relative to the drive shaft steps.

Having thus described my invention, what I claim is:

1. In a phonograph turntable drive unit on a frame for driving an annular rim of a turntable from an axially stepped drive shaft, and including a shifter plate on said frame and a cam formed on said shifter plate, the provision of an idler wheel mechanism with an idler wheel disposable in driving engagement between any step of said drive shaft and the inner surface of said annular rim, said idler mechanism comprising an idler plate having first and second ends, a spindle on said first end, said idler wheel journaled on said spindle, an idler link pivotly mounted on said frame and movably mounting said second end of said idler plate with the axis of said spindle substantially perpendicular to said frame and establishing limited movement of said idler wheel in two directions in a plane substantially parallel to said frame, extensible means in said idler link engaging said cam whereby the axial position of said idler wheel relative to said drive shaft may be adjusted after the drive unit is completely assembled by moving said extensible means to compensate for manufacturing tolerances in any of said frame, drive shaft, shifter plate, idler plate, idler wheel and mounting means.

2. The idler wheel mechanism in a phonograph turntable drive unit as set forth in claim 1 and wherein spring means positioned between said idler plate and said frame normally urge said idler wheel toward the annular rim of said turntable and said drive shaft.

3. In a phonograph turntable drive unit on a frame for driving an annular rim of a turntable from an axially stepped drive shaft, and including a cam movably positioned on said frame, the provision of an idler wheel mechanism with an idler wheel disposable in driving engagement between any step of said drive shaft and the inner surface of said annular rim, said idler mechanism comprising an idler plate, a spindle on one end of said idler plate, said idler wheel journaled on said spindle, an idler link having first and second ends, said first end thereof journaled on said frame on an axis substantially perpendicular to said frame, said second end thereof journaled on said other end of said idler plate with the axis of said spindle substantially perpendicular to said frame, said idler plate and idler link establishing limited movements of said idler wheel in two directions in a plane substantially parallel to said frame, and means including screw means in said idler link engaging said cam whereby the axial position of said idler wheel relative to said stepped drive shaft may be adjusted after the drive unit is completely assembled by rotating said screw means to compensate for manufacturing tolerances in any of said frame, cam drive shaft, idler link, idler plate, idler wheel and screw means.

4. The idler wheel mechanism in a phonograph turntable drive unit as set forth in claim 3 and wherein spring means positioned between said idler plate and said frame normally urge said idler wheel toward the annular rim of said turntable and said drive shaft.

5. In a phonograph turntable drive unit on a frame for driving an annular rim of a turntable from an axially stepped drive shaft and including a shifter plate movably mounted on said frame and having a stepped cam on said shifter plate, the provision of an idler wheel mechanism with an idler wheel disposable in driving engagement between any step of said drive shaft and the inner surface of said annular rim, said idler mechanism comprising an idler plate having first and second ends, first bearing means journalling said idler wheel on said idler plate second end, an idler link having first and second ends, second bearing means journalling said first end of said idler link relative to said frame on an axis substantially perpendicular to said frame, third bearing means journalling said idler plate first end on said idler link second end with the axis of said first and third bearing means substantially perpendicular to said frame, and adjustable extension means in said idler link engaging said stepped cam whereby the axial position of said idler wheel relative to said stepped drive shaft may be adjusted after the drive unit is completely assembled by adjusting said extension means to compensate for manufacturing tolerances in any of said frame, cam, drive shaft, first, second, and third bearing means, idler link, idler plate and idler wheel.

6. The idler wheel mechanism in a phonograph turntable drive unit as set forth in claim 5 and wherein spring means positioned between said idler plate and said frame normally urge said idler wheel toward the annular rim of said turntable and said drive shaft.

No references cited.